(12) United States Patent
Cho et al.

(10) Patent No.: US 10,967,858 B2
(45) Date of Patent: Apr. 6, 2021

(54) VEHICLE AND SPEED-LIMIT CONTROL METHOD THEREFOR

(71) Applicants: Hyundai Motor Company, Seoul (KR); Kia Motors Corporation, Seoul (KR)

(72) Inventors: Jin Kyeom Cho, Gyeonggi-do (KR); Hui Un Son, Seoul (KR); Joon Young Park, Seoul (KR); Sung Deok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 253 days.

(21) Appl. No.: 16/183,181

(22) Filed: Nov. 7, 2018

(65) Prior Publication Data

US 2019/0176822 A1 Jun. 13, 2019

(30) Foreign Application Priority Data

Dec. 7, 2017 (KR) .......................... 10-2017-0167321

(51) Int. Cl.
*B60W 30/14* (2006.01)
*B60W 50/00* (2006.01)
*B60K 31/00* (2006.01)

(52) U.S. Cl.
CPC .......... *B60W 30/146* (2013.01); *B60K 31/00* (2013.01); *B60W 50/0098* (2013.01); *B60K 2031/0091* (2013.01); *B60W 2050/0083* (2013.01); *B60W 2510/1005* (2013.01); *B60W 2520/10* (2013.01); *B60W 2540/10* (2013.01)

(58) Field of Classification Search
CPC ...... B60W 60/00; B60W 30/08; B60W 30/09; B60W 30/095; G05D 1/0212; G05D 1/0257; G05D 1/024; G05D 1/0229; G05D 2201/0212; G05D 1/0238
See application file for complete search history.

(56) References Cited

U.S. PATENT DOCUMENTS 5,036,936 A * 8/1991 Kawano ............... B60K 31/047
180/179
6,128,564 A * 10/2000 Graf ....................... B60W 10/11
701/51

(Continued)

*Primary Examiner* — Mussa A Shaawat
(74) *Attorney, Agent, or Firm* — Mintz Levin Cohn Ferris Glovsky and Popeo, P.C.; Peter F. Corless (57) ABSTRACT

A vehicle speed-limit control method is provided. The method includes determining whether a speed-limit control inactivation condition is satisfied by accelerator pedal engaged when speed-limit control is activated. In response to determining that the inactivation condition is satisfied, a candidate value of an accelerator pedal sensor (APS) and a candidate gear shift stage are determined and a speed margin is determined based on the candidate value of the APS, the candidate gear shift stage and a vehicle speed. The speed margin is compared with a predetermined threshold. The candidate gear shift stage is determined as a transition gear shift stage and the candidate value of the APS is determined as a transition value of the APS when the speed margin is equal to or greater than the threshold. The vehicle is operated based on the transition gear shift stage and the transition value of the APS.

19 Claims, 4 Drawing Sheets

(56) References Cited

U.S. PATENT DOCUMENTS

| | | | |
|---|---|---|---|
| 6,202,779 B1* | 3/2001 | Musat | A01D 34/64 180/170 |
| 6,389,351 B1* | 5/2002 | Egawa | B60K 31/0008 340/903 |
| 6,434,472 B1* | 8/2002 | Minowa | B60W 10/18 701/96 |
| 8,855,874 B2* | 10/2014 | Eriksson | B60W 30/143 701/53 |
| 9,802,598 B2* | 10/2017 | Choi | B60W 20/11 |
| 2001/0014845 A1* | 8/2001 | Minowa | B60W 10/18 701/84 |
| 2002/0161487 A1* | 10/2002 | Kojima | G05G 1/30 701/1 |
| 2003/0236608 A1* | 12/2003 | Egami | G05G 1/38 701/70 |
| 2005/0065687 A1* | 3/2005 | Hijikata | G01S 17/931 701/41 |
| 2005/0102082 A1* | 5/2005 | Joe | B60K 6/365 701/54 |
| 2007/0287589 A1* | 12/2007 | Kadono | F16H 61/0437 477/110 |
| 2008/0140294 A1* | 6/2008 | Park | B60W 50/16 701/93 |
| 2008/0141820 A1* | 6/2008 | Park | B60W 50/16 74/513 |
| 2008/0312036 A1* | 12/2008 | Yagi | F16H 61/0213 477/115 |
| 2009/0265072 A1* | 10/2009 | Kondou | B60W 30/025 701/90 |
| 2010/0250088 A1* | 9/2010 | Grolle | B60W 10/184 701/96 |
| 2012/0101700 A1* | 4/2012 | Mitchell | F16H 61/21 701/58 |
| 2012/0130597 A1* | 5/2012 | Aoyagi | B60W 30/18127 701/48 |
| 2013/0085633 A1* | 4/2013 | Ohno | B60K 6/46 701/22 |
| 2016/0200310 A1* | 7/2016 | Amemiya | B60W 20/00 701/22 |
| 2017/0057506 A1* | 3/2017 | Jerger | B60W 10/06 |
| 2017/0197619 A1* | 7/2017 | Kelly | B60W 10/04 |
| 2017/0335904 A1* | 11/2017 | Kim | F16H 63/46 |
| 2018/0229727 A1* | 8/2018 | Kelly | F16H 63/42 |
| 2018/0236983 A1* | 8/2018 | Moury | B60W 50/10 |
| 2020/0086869 A1* | 3/2020 | Oguro | B60W 10/04 |

\* cited by examiner

VEHICLE AND SPEED-LIMIT CONTROL METHOD THEREFOR

CROSS-REFERENCE TO RELATED APPLICATION(S)

This application claims the benefit of Korean Patent Application No. 10-2017-0167321, filed on Dec. 7, 2017, which is hereby incorporated by reference as if fully set forth herein.

BACKGROUND

Field of the Invention

The present invention relates to a vehicle and a speed-limit control method therefor, and more particularly, to a vehicle that improves drivability when a speed-limit control system is inactivated and a method of controlling the same.

Discussion of the Related Art

Recently, vehicles equipped with a speed-limit control (SLC) system have been released on the market. The SLC system limits the vehicle speed to prevent the vehicle from accelerating above the speed set by the driver. In general, the driver may selectively activate or inactivate (e.g., turn on or off) the SLC system, and may also set a speed limit by manipulating a switch provided on a steering wheel.

The driving of the vehicle at a speed below the speed limit when the SLC system is activated is not substantially different from the driving of the vehicle when the SLC system is inactivated. When the current vehicle speed reaches the speed limit, the vehicle is prevented from accelerating above the speed limit. However, in the state in which the current vehicle speed reaches the speed limit, when the depression amount of the accelerator pedal by the driver exceeds a predetermined threshold (e.g. 80%), the SLC system is inactivated, and the vehicle may travel at a speed equal to or greater than the speed limit.

In particular, when the SLC system is inactivated or the vehicle is driven at a speed equal to or less than the speed limit, the vehicle determines driver demand torque based on the value of an accelerator pedal sensor (APS) and the value of a brake pedal sensor (BPS), and determines torques and numbers of revolutions per minute (RPMs) of a gear shift stage and an engine (in the case of a hybrid electric vehicle, an electric motor being included) based on the determined driver demand torque. However, when the SLC system is activated and the vehicle speed reaches the speed limit, to maintain the vehicle speed at the speed limit or less, the vehicle calculates demand torque using the virtual value of the APS, rather than the actual value of the APS. When the actual value of the APS reaches the threshold, the vehicle does not use the virtual value of the APS, but refers to the actual value of the APS.

Additionally, when the current vehicle speed reaches the speed limit and the driver intends to accelerate and thus inactivates the SLC system by depressing the accelerator pedal, the powertrain is controlled based on the actual value of the APS at the time of inactivation, as described above. In this manner, a relatively low virtual value of the APS is used to maintain the vehicle speed at the speed limit before the SLC system is inactivated, but the actual value of the APS, which is about 80% or greater, is suddenly used when the SLC system is inactivated. This sudden change in the value of the APS causes unnecessary gear shifting. A description thereof will now be made with reference to FIG. 1 of the related art.

Figure 1:
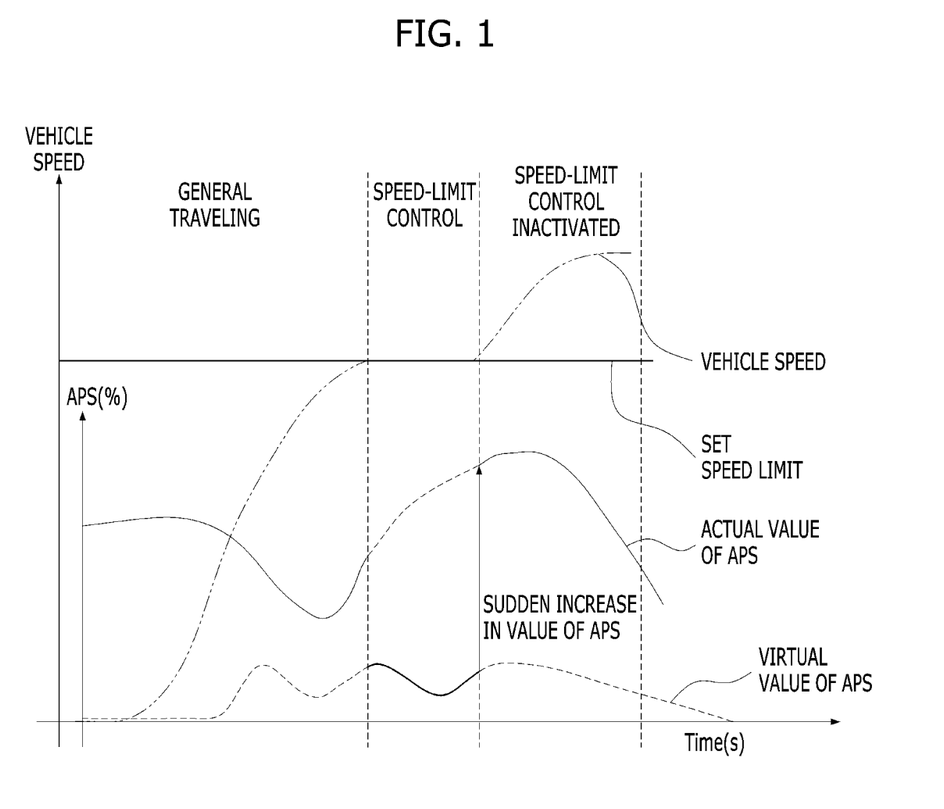
FIG. 1 is a view showing an example of sudden gear shifting due to inactivation of a general speed-limit control system according to the related art.

FIG. 1 is a view showing an example of sudden gear shifting due to inactivation of a general speed-limit control (SLC) system. In the graph of FIG. 1, the vertical axis represents vehicle speed and the value of the APS, and the horizontal axis represents time. With regard to the virtual value of the APS and the actual value of the APS, portions shown by the solid line represent values that are used for powertrain control, and portions shown by the dotted line represent values that are not used.

Referring to FIG. 1, when the SLC system is activated, the actual value of the APS is used in the powertrain until the vehicle speed reaches the set speed limit. When the vehicle speed reaches the set speed limit, the virtual value of the APS is used, and thus, the vehicle speed is maintained at the set speed limit. However, when the actual value of the APS reaches the value at which the SLC system is inactivated, the SLC system is inactivated, and the actual value of the APS is immediately used in the powertrain. Thus, the powertrain undergoes a sudden change in the value of the APS, which may cause undesirable kick-down shifting. At this time, if the depression amount of the accelerator pedal is decreased by a driver (e.g., unfamiliar with this situation), up-shifting to a higher gear stage occurs. In this manner, unnecessary gear shifting frequently occurs.

SUMMARY

Accordingly, the present invention is directed to a vehicle and a speed-limit control method therefor that substantially obviate one or more problems due to limitations and disadvantages of the related art. An object of the present invention is to provide a speed-limit control method capable of preventing unnecessary gear shifting and consequent deterioration in drivability when a speed-limit control system is inactivated and a vehicle for performing the method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to the purpose of the invention, as embodied and broadly described herein, a speed-limit control method for a vehicle may include determining whether a speed-limit control inactivation condition is satisfied by depression of an accelerator pedal in the state in which speed-limit control is activated, in response to determining that the inactivation condition is satisfied, determining a candidate value of an accelerator pedal sensor and a candidate gear shift stage, determining a speed margin based on the candidate value of the accelerator pedal sensor, the candidate gear shift stage and a vehicle speed, comparing the speed margin with a predetermined threshold, determining the candidate gear shift stage as a transition gear shift stage and determining the candidate value of the accelerator pedal sensor as a transition value of the accelerator pedal sensor when the speed margin is equal to or greater than the threshold, and operating the vehicle to travel based on the transition gear shift stage and the transition value of the accelerator pedal sensor.

In another aspect of the present invention, a speed-limit control system for a vehicle may include a start determination unit configured to determine whether a speed-limit control inactivation condition is satisfied by depression of an accelerator pedal in the state in which speed-limit control is activated, and a transition determination unit configured to, when the start determination unit determines that the inactivation condition is satisfied, determine a candidate value of an accelerator pedal sensor and a candidate gear shift stage, determine a speed margin based on the candidate value of the accelerator pedal sensor, the candidate gear shift stage and a vehicle speed, compare the speed margin with a predetermined threshold, determine the candidate gear shift stage as a transition gear shift stage and determine the candidate value of the accelerator pedal sensor as a transition value of the accelerator pedal sensor when the speed margin is equal to or greater than the threshold; and a controller configured to operate the vehicle to travel based on the transition gear shift stage and the transition value of the accelerator pedal sensor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. However, it will be understood that the present invention should not be limited to the exemplary embodiments and may be modified in various ways. In the drawings, to clearly and briefly explain the present invention, an illustration of elements having no connection with the description is omitted, and the same or extremely similar elements are designated by the same reference numerals throughout the specification. Wherever possible, the same reference numbers will be used throughout the drawings to refer to the same or like parts.

An exemplary embodiment of the present invention proposes to perform transition control at the time at which a speed-limit control system is inactivated to prevent a sudden change in the value of an accelerator pedal sensor (APS) that is input to a powertrain when the speed-limit control system is inactivated by driver's depression of the accelerator pedal. The method described herein below may be executed by a controller having a processor and a memory.

In an aspect of this exemplary embodiment, the transition control may include determining a transition value of the APS and a transition gear shift stage. In particular, the transition value of the APS and the transition gear shift stage may be determined through one or more candidate values of the APS and one or more candidate gear shift stages, respectively. The candidate value of the APS and the candidate gear shift stage may be determined in advance based on the current value of the APS and the current vehicle speed. In a gear shift map, when the distance between the candidate value of the APS and a down-shift line adjacent thereto is less than a predetermined threshold, the candidate gear shift stage may be shifted up by one stage, and the candidate value of the APS may be changed to the maximum value of the APS in the line that corresponds to the corresponding gear shift stage.

The up-shifting of the candidate gear shift stage and the change in the candidate value of the APS may be repeated until the distance between the candidate value of the APS and the down-shift line adjacent thereto becomes equal to or greater than the predetermined threshold. The candidate value of the APS and the candidate gear shift stage derived when the above distance becomes equal to or greater than the predetermined threshold may be determined as the transition value of the APS and the transition gear shift stage, respectively.

The vehicle (e.g., a controller thereof) may be configured to operate the powertrain according to the determined transition value of the APS and the determined transition gear shift stage. When the actual value of the APS becomes equal to or less than the transition value of the APS or when the current vehicle speed is greater than a value calculated by applying a margin to the speed limit, the transition control may be inactivated.

Prior to describing the transition control process that is performed at the time of inactivation of the speed-limit control system according to this exemplary embodiment, the configuration of a vehicle for performing the transition control will be described.

Figure 2:
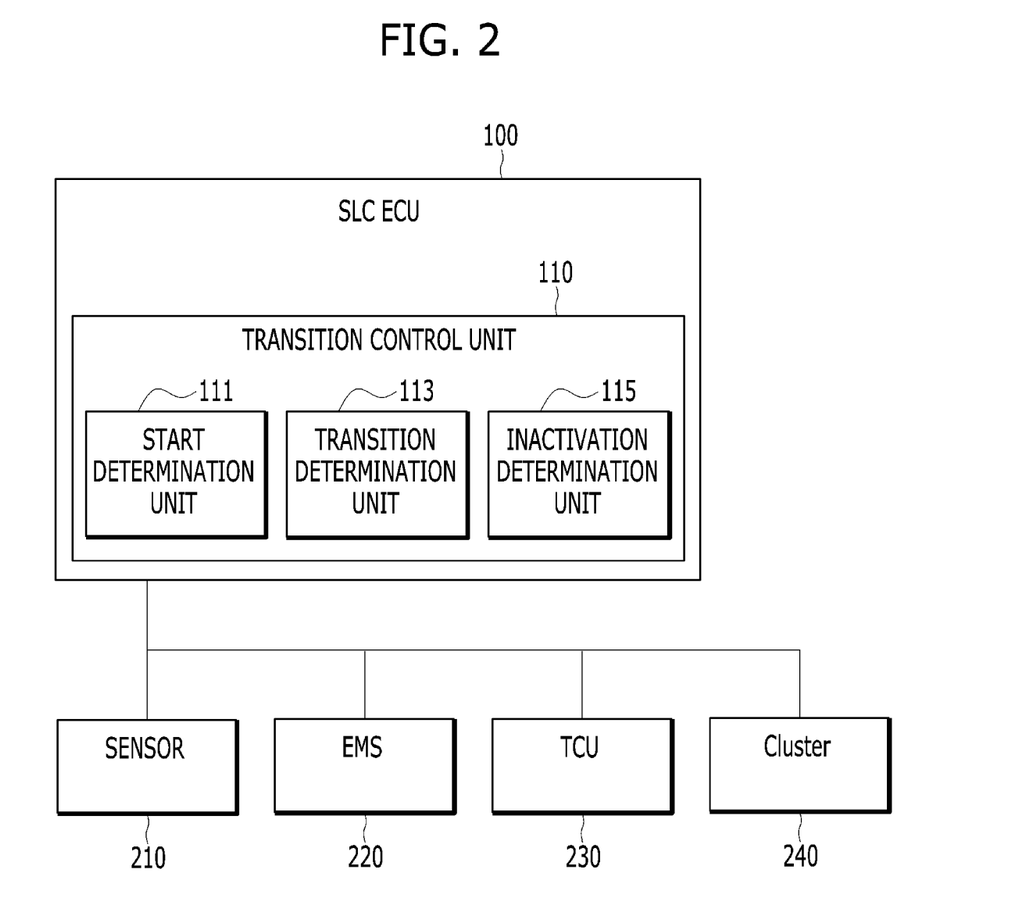
FIG. 2 is a block diagram showing the configuration of a vehicle according to an exemplary embodiment of the present invention.

FIG. 2 is a block diagram of the configuration of a vehicle according to an exemplary embodiment of the present invention. Referring to FIG. 2, a vehicle according to an exemplary embodiment may include a speed-limit control electronic control unit (SLC ECU) 100 configured to perform a speed-limit control function, various sensors 210, an engine management system (EMS) 220 configured to operate an engine, a transmission control unit (TCU) 230 configured to operate a transmission, and a cluster 240.

The SLC ECU 100 may be configured to adjust the vehicle speed using a virtual value of the APS when the vehicle speed reaches the speed limit according to the set speed-limit control function. The SLC ECU 100 according to this exemplary embodiment may include a transition controller 110. A detailed description of the configuration of the transition controller 110 will be made later.

Further, the sensors 210 may include an accelerator pedal sensor (APS), a brake pedal sensor (BPS), and buttons/switches for selectively activating or inactivating the speed-limit control system or for setting a speed limit. The EMS 220 may be configured to adjust the torque, the number of revolutions per minute (RPM) and the power of the engine. The cluster 240 may provide the driver with visual information regarding the activation or inactivation of the speed-limit control system, the set speed limit and the performance or non-performance of the transition control according to this exemplary embodiment.

The transition controller 110 may include a start determination unit 111 configured to determine whether the speed-limit control is inactivated by depression or engagement of the accelerator pedal, a transition determination unit 113 configured to determine a candidate/transition value of the APS and a candidate/transition gear shift stage, and an inactivation determination unit 115 configured to inactivate the powertrain control, performed using the transition value of the APS, when a prescribed condition is satisfied.

Figure 3:
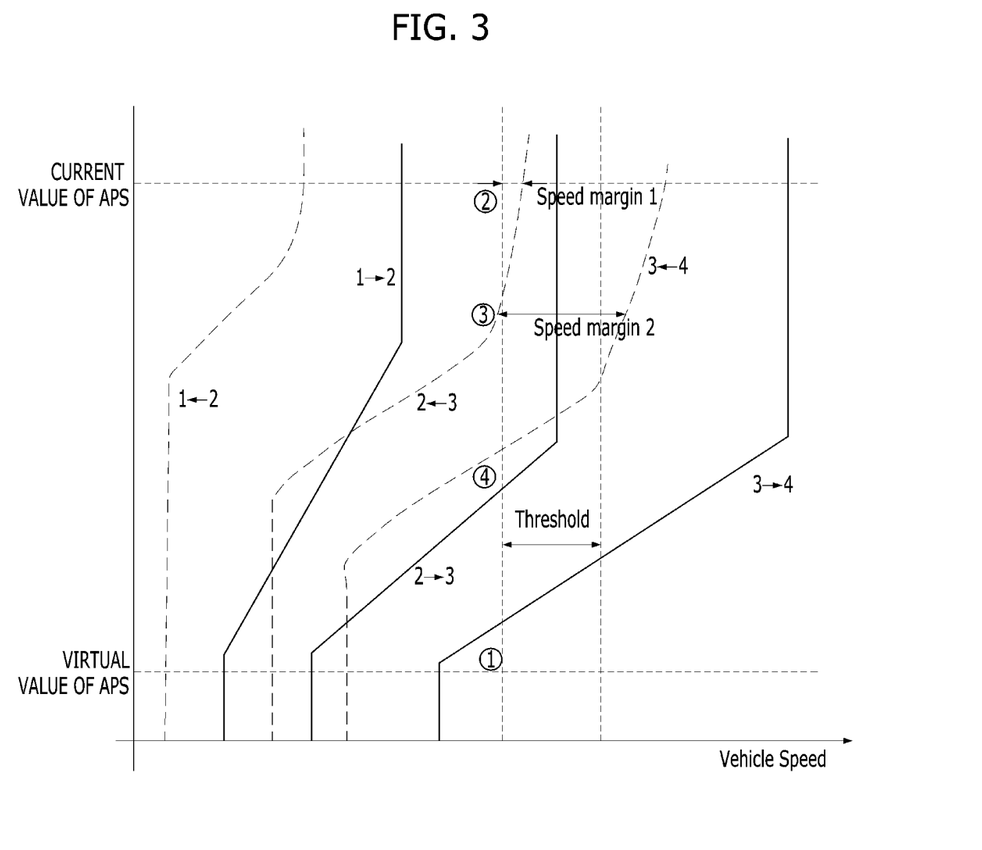
FIG. 3 is a view showing a gear shift map and a transition control process using the same according to an exemplary embodiment of the present invention.

Hereinafter, an example of the transition control process according to this exemplary embodiment will be described with reference to FIGS. 3 and 4 based on the configuration of the vehicle described above with reference to FIG. 2. FIG. 3 is a view of a gear shift map and a transition control process using the same according to an exemplary embodiment of the present invention, and FIG. 4 is a flowchart of the transition control process according to an exemplary embodiment of the present invention.

FIG. 3 illustrates a gear shift map. The vertical axis in the gear shift map represents the value of the APS, and the horizontal axis therein represents vehicle speed. The graph shown by the solid line represents an up-shift line, and the graph shown by the dotted line represents a down-shift line. For example, when the current vehicle speed and the value of the APS correspond to point ①, the current gear stage is the fourth gear stage. When only the value of the APS is changed to a value corresponding to point ④ or higher while maintaining the vehicle speed, the coordinate value in the gear shift map passes through the 4→3 gear shift line, and thus down-shifting to the third gear stage occurs.

It may be assumed that the current value of the APS corresponds to point ②, at which the speed-limit control system is inactivated. Further, in FIG. 4, it may be assumed that the vehicle is traveling at the set speed limit in the state in which the speed-limit control system is activated. Therefore, the powertrain may be operated based on the virtual value of the APS that corresponds to point ① in FIG. 3.

Figure 4:
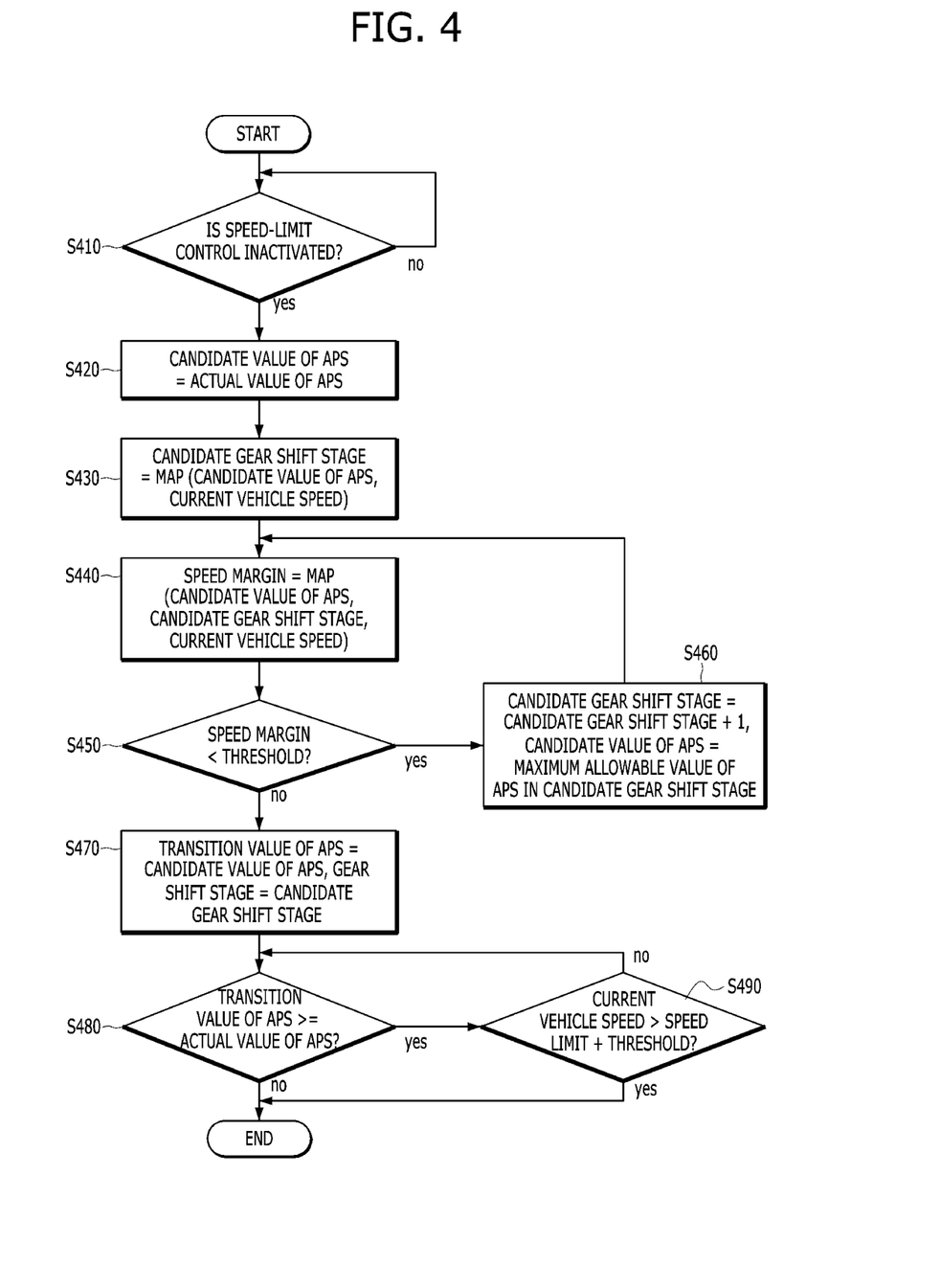
FIG. 4 is a flowchart showing the transition control process according to an exemplary embodiment of the present invention.

Referring to FIG. 4, the start determination unit 111 may be configured to determine whether the speed-limit control is inactivated by depression or engagement of the accelerator pedal (S410). When the speed-limit control is inactivated, the transition determination unit 113 may be configured to determine the actual value of the APS as a candidate value of the APS (S420), and determine a candidate gear shift stage by applying the determined candidate value of the APS and the current vehicle speed to the gear shift map of FIG. 3 (S430). For example, in FIG. 3, the candidate value of the APS becomes a value corresponding to point ② according to the actual value of the APS, and the candidate gear shift stage becomes the second gear stage when the vehicle speed is additionally considered therewith.

Subsequently, a speed margin may be determined by applying the candidate value of the APS, the candidate gear shift stage and the current vehicle speed to the gear shift map (S440). The speed margin refers to a difference between the current vehicle speed and the speed in the down-shift line that corresponds to the current candidate gear shift stage when the vehicle is being driven based on the current candidate value of the APS. In other words, in FIG. 3, when the candidate value of the APS corresponds to point ②, the down-shift line that corresponds to the second gear stage, which is the current candidate gear shift stage, is the 2←3 gear shift line, and the speed margin, which is the difference between the current vehicle speed and the speed in the 2←3 gear shift line, corresponds to "Speed Margin 1".

The transition determination unit 113 may be configured to determine whether the speed margin is less than a predetermined threshold (S450). In response to determining that the speed margin is less than the threshold, the transition determination unit 113 may be configured to shift the candidate gear shift stage up by one stage, and determine the candidate value of the APS as the maximum allowable value of the APS in the up-shifted gear stage (S460). For example, when an existing candidate gear shift stage is the second gear stage, the candidate gear shift stage may become the third gear stage. In FIG. 3, the candidate value of the APS may be determined as a value that corresponds to point ③, which is the maximum value of the APS that is allowed in the third gear stage. For example, the maximum value of the APS may be 70% to 90%.

The speed margin may be compared with the threshold based on the following. When control is performed according to the actual value of the APS (②), in the situation shown in FIG. 3, down-shifting may be performed from the fourth gear stage, maintained before the inactivation of the speed-limit control system, to the second gear stage by the 2←3 gear shift line. However, when the sensed value of the APS is high enough to inactivate the speed-limit control system at a relatively low gear shift stage, the vehicle speed may increase immediately, and thus up-shifting may be performed from the second gear stage to the third gear stage by the 2→3 gear shift line. Therefore, in this exemplary embodiment, to prevent unnecessary gear shifting, a speed margin may be calculated and compared with a threshold.

When the candidate gear shift stage and the candidate value of the APS are changed, the speed margin may be calculated again based on the changed values (S440). In FIG. 3, when the candidate value of the APS corresponds to point ③, the down-shift line adjacent thereto in the acceleration direction is the 3←4 gear shift line, and the speed margin, which is the difference between the current vehicle speed and the speed in the 3←4 gear shift line, corresponds to "Speed Margin 2".

As shown in FIG. 3, since the "Speed Margin 2" is greater than the threshold (no at S450), the candidate value of the APS may be finally determined as the transition value of the APS, and the candidate gear shift stage may be finally determined as the transition gear shift stage (S470). In other words, in the case of FIG. 3, the transition value of the APS may be determined as a value that corresponds to point ③, and the transition gear shift stage is the third gear stage.

Accordingly, the vehicle may be driven according to the transition value of the APS and the transition gear shift stage. When the inactivation determination unit 115 determines that the transition value of the APS is less than the actual value of the APS (S480) or determines that the transition value of the APS is equal to or greater than the actual value of the APS and that the current vehicle speed is greater than the sum of the set speed limit and the threshold (S490), the transition control may be inactivated, and the engine and the transmission may be operated according to the actual value of the APS and the current vehicle speed.

The invention described above may be implemented as computer-readable code in a medium in which a program is recorded. Computer-readable recording media include all kinds of recording devices in which data readable by computer systems is stored. The computer-readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a vehicle according to at least one exemplary embodiment of the present invention configured as described above may prevent unnecessary gear shifting through transition control when a speed-limit control system is inactivated, thereby improving drivability. In addition, it may be possible to improve the durability of a transmission by preventing frequent gear shifting.

It will be appreciated by those skilled in the art that the effects achievable through the present invention are not limited to those that have been specifically described hereinabove, and other effects of the present invention will be more clearly understood from the above detailed description. The above detailed description is not to be construed as limiting the present invention in any aspect, and is to be considered by way of example. The scope of the present invention should be determined by reasonable interpretation of the accompanying claims, and all equivalent modifications made without departing from the present invention should be included in the following claims.

What is claimed is:

1. A speed-limit control method for a vehicle, comprising:
   determining, by a controller, whether a speed-limit control inactivation condition is satisfied by depression of an accelerator pedal in a state in which speed-limit control is activated;
   in response to determining that the inactivation condition is satisfied, determining, by the controller, a candidate value of an accelerator pedal sensor and a candidate gear shift stage;
   determining, by the controller, a speed margin based on the candidate value of the accelerator pedal sensor, the candidate gear shift stage, and a vehicle speed;
   comparing, by the controller, the speed margin with a predetermined threshold;
   determining, by the controller, the candidate gear shift stage as a transition gear shift stage and determining the candidate value of the accelerator pedal sensor as a transition value of the accelerator pedal sensor, when the speed margin is equal to or greater than the threshold; and
   operating, by the controller, the vehicle to travel based on the transition gear shift stage and the transition value of the accelerator pedal sensor.

2. The speed-limit control method according to claim 1, wherein the determining of the candidate value of the accelerator pedal sensor and the candidate gear shift stage includes:
   determining, by the controller, a current value of the accelerator pedal sensor as the candidate value of the accelerator pedal sensor; and
   determining, by the controller, the candidate gear shift stage by matching the candidate value of the accelerator pedal sensor and a current vehicle speed in a predetermined gear shift map.

3. The speed-limit control method according to claim 2, wherein the determining of the speed margin includes:
   determining, by the controller, a difference in speed between a point, indicated by the candidate value of the accelerator pedal sensor and the current vehicle speed, and a down-shift line that corresponds to the candidate gear shift stage in the gear shift map.

4. The speed-limit control method according to claim 3, wherein the down-shift line corresponding to the candidate gear shift stage includes a down-shift line that corresponds to a criterion on which gear-shifting from a stage higher than the candidate gear shift stage to the candidate gear shift stage is performed.

5. The speed-limit control method according to claim 1, further comprising:
   when the speed margin is less than the threshold, changing, by the controller, the candidate gear shift stage and the candidate value of the accelerator pedal sensor.

6. The speed-limit control method according to claim 5, wherein the changing includes:
   changing, by the controller, the candidate gear shift stage to be shifted up by one stage; and changing, by the controller, the candidate value of the accelerator pedal sensor to a maximum allowable value of the accelerator pedal sensor in the changed candidate gear shift stage.

7. The speed-limit control method according to claim 5, further comprising:
after the changing, re-performing, by the controller, the determining of the speed margin and the comparing with respect to the changed candidate gear shift stage and the changed candidate value of the accelerator pedal sensor.

8. The speed-limit control method according to claim 7, wherein the changing and the re-performing are repeated until the speed margin becomes equal to or greater than the threshold.

9. The speed-limit control method according to claim 1, further comprising:
when the transition value of the accelerator pedal sensor is less than an actual value of the accelerator pedal sensor or when a current vehicle speed is greater than a sum of a speed limit and the threshold, operating, by the controller, the vehicle to travel based on the current vehicle speed and the actual value of the accelerator pedal sensor.

10. A non-transitory computer-readable recording medium for recording a program for performing a speed-limit control method for a vehicle according to claim 1.

11. A speed-limit control system for a vehicle, comprising:
a start determination unit configured to determine whether a speed-limit control inactivation condition is satisfied by depression of an accelerator pedal in a state in which speed-limit control is activated;
a transition determination unit configured to determine, a candidate value of an accelerator pedal sensor and a candidate gear shift stage in response to the inactivation condition being satisfied, determine a speed margin based on the candidate value of the accelerator pedal sensor, the candidate gear shift stage and a vehicle speed, compare the speed margin with a predetermined threshold, determine the candidate gear shift stage as a transition gear shift stage and determine the candidate value of the accelerator pedal sensor as a transition value of the accelerator pedal sensor when the speed margin is equal to or greater than the threshold; and
a controller configured to operate the vehicle to travel based on the transition gear shift stage and the transition value of the accelerator pedal sensor.

12. The speed-limit control system according to claim 11, wherein the transition determination unit is configured to determine a current value of the accelerator pedal sensor as the candidate value of the accelerator pedal sensor, and determine the candidate gear shift stage by matching the candidate value of the accelerator pedal sensor and a current vehicle speed in a predetermined gear shift map.

13. The speed-limit control system according to claim 12, wherein the transition determination unit is configured to determine a difference in speed between a point, indicated by the candidate value of the accelerator pedal sensor and the current vehicle speed, and a down-shift line that corresponds to the candidate gear shift stage in the gear shift map as the speed margin.

14. The speed-limit control system according to claim 13, wherein the down-shift line that corresponds to the candidate gear shift stage includes a down-shift line that corresponds to a criterion on which gear-shifting from a stage higher than the candidate gear shift stage to the candidate gear shift stage is performed.

15. The speed-limit control system according to claim 11, wherein, when the speed margin is less than the threshold, the transition determination unit is configured to change the candidate gear shift stage and the candidate value of the accelerator pedal sensor.

16. The speed-limit control system according to claim 15, wherein, when changing the candidate gear shift stage and the candidate value of the accelerator pedal sensor, the transition determination unit is configured to change the candidate gear shift stage to be shifted up by one stage, and change the candidate value of the accelerator pedal sensor to a maximum allowable value of the accelerator pedal sensor in the changed candidate gear shift stage.

17. The speed-limit control system according to claim 15, wherein the transition determination unit is configured to repeat the determination of the speed margin and comparison with the threshold with respect to the changed candidate gear shift stage and the changed candidate value of the accelerator pedal sensor.

18. The speed-limit control system according to claim 17, wherein the transition determination unit is configured to repeat the change of the candidate gear shift stage and the candidate value of the accelerator pedal sensor until the speed margin becomes equal to or greater than the threshold.

19. The speed-limit control system according to claim 11, wherein the controller is configured to operate the vehicle to travel based on the current vehicle speed and the actual value of the accelerator pedal sensor when the transition value of the accelerator pedal sensor is less than an actual value of the accelerator pedal sensor or when a current vehicle speed is greater than a sum of a speed limit and the threshold.

* * * * *